United States Patent [19]
Matsuo et al.

[11] 4,259,092
[45] Mar. 31, 1981

[54] ADSORPTIVE MATERIAL

[75] Inventors: Tatsuki Matsuo; Nobuo Ishizaki; Yoichi Suzuki, all of Otsu, Japan

[73] Assignee: Toyo Boseki Kabushiki Kaisha, Osaka, Japan

[21] Appl. No.: 780,453

[22] Filed: Mar. 23, 1977

[30] Foreign Application Priority Data

Mar. 23, 1976 [JP] Japan .................................. 51/32227

[51] Int. Cl.³ .......................... B01D 53/06; B32B 3/28
[52] U.S. Cl. .......................................... 55/78; 55/390;
428/184; 428/186; 428/224; 428/367; 428/902;
428/906; 428/921; 428/185
[58] Field of Search ............... 428/184, 408, 182, 186,
428/367, 906, 185, 902, 921; 210/503, 507, 508,
488, 493 R, 497; 23/288 F; 55/74, 83, 97, 387,
390, 521, 35, 78; 165/165; 162/109, 123, 129,
159

[56] References Cited

U.S. PATENT DOCUMENTS

| | | | |
|---|---|---|---|
| 3,183,649 | 5/1965 | Teller | 55/390 |
| 3,327,859 | 6/1967 | Pall | 210/503 |
| 3,800,515 | 4/1974 | Asker et al. | 55/387 |
| 3,949,115 | 4/1976 | Tamura et al. | 428/902 |
| 3,982,981 | 9/1976 | Takao et al. | 428/184 |

Primary Examiner—Paul J. Thibodeau
Attorney, Agent, or Firm—Birch, Stewart, Kolasch & Birch

[57] ABSTRACT

A multi-layer member of corrugated board made of active carbon fibers having an equilibrium adsorption amount of benzene of not less than 200 mg/g and a benzene adsorption rate constant of not less than 0.2 min$^{-1}$.

19 Claims, 7 Drawing Figures

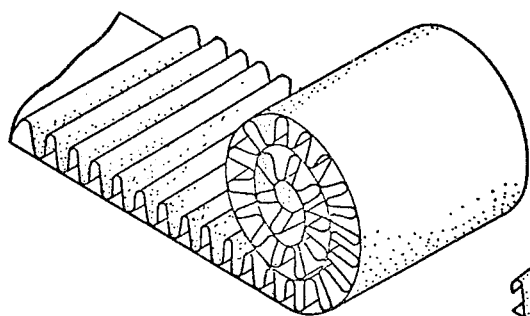
Fig. 4
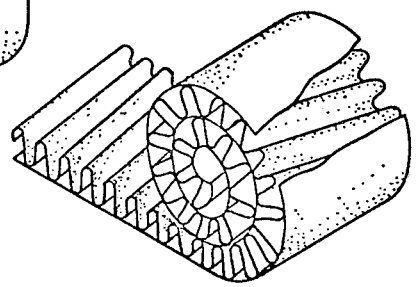
Fig. 5
Fig. 6
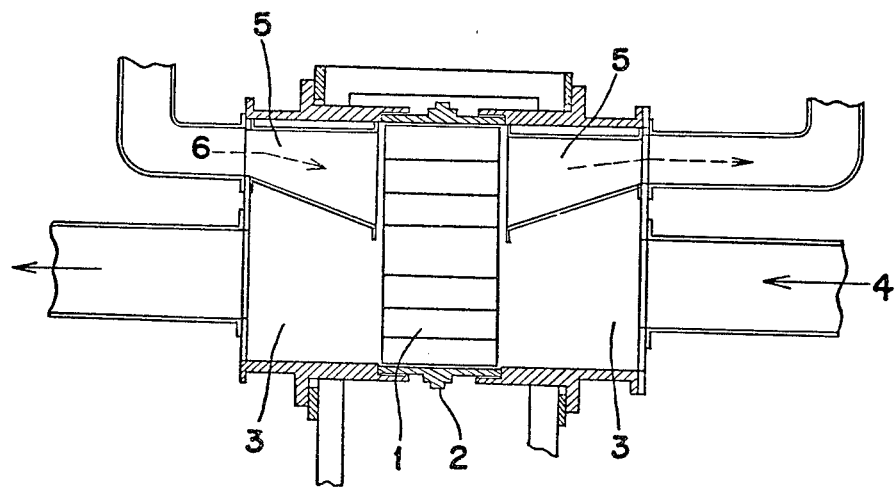

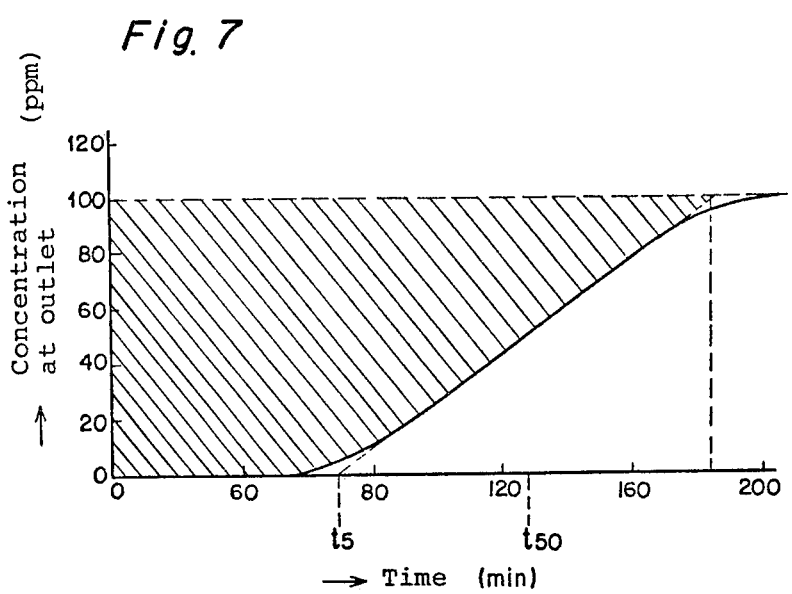

ADSORPTIVE MATERIAL

The present invention relates to a multi-layer member of corrugated board made of active carbon fibers useful as an adsorptive material. More particularly, it relates to a multi-layer member of corrugated board made of active carbon fibers having a large adsorptive surface area and a high adsorption rate, which is useful, for instance, as an adsorptive material or a carrier for catalyst.

An object of the present invention is to provide an adsorption apparatus having a small pressure loss and a large treating capacity. Another object of this invention is to provide a carrier having a large capacity for carrying a catalyst or an absorbing agent and, as the result, a catalytic reactor or an absorbing apparatus of large treating capacity and efficiency.

As an adsorptive layer in an adsorption apparatus, there has hitherto been used the layer filled with granular active carbon. However, such layer, having a slow rate of adsorption, requires to be formed into a considerably large thickness of adsorptive zone, for instance, 20 to 40 cm, and has a defect in that when a fluid is passed through such an adsorptive layer the treated fluid sustains a large pressure loss. Recently there has been proposed a fixed adsorptive layer for which a fibrous active carbon is used. If adequately produced, active carbon fiber has extremely large rate of adsorption, and the thickness of the adsorptive layer can be sufficiently decreased, for example, to a degree of 1 to 8 cm. However, the volume density of the mass of active carbon fiber is generally considerably smaller than that of the granular active carbon, for example, about 0.05 g/cc in the needle-punched non-woven fabric of active carbon fiber and 0.4 g/cc in the mass of granular active carbon. Due to these characteristics there have been cases where the adsorption capacity per fixed volume is not much improved despite the use of an active carbon fiber. Also, when the volume density of the active carbon fiber is increased, the pressure loss is sharply increased.

The present invention provides an adsorptive member having a high volume efficiency of adsorption capacity and yet small pressure loss. More precisely, the present invention provides a multi-layer member of corrugated board consisting of a sheet containing an active carbon fiber.

The active carbon fiber to be used for the present invention is a fibrous active carbon fiber, which is required to possess the characteristics of the equilibrium adsorption amount of benzene of more than 200 mg/g and the benzene adsorption rate constant of more than 0.2 min$^{-1}$. Especially, the large rate of adsorption is a characteristic of the active carbon fiber of the present invention un-ravelled with other active carbons. it is by the use of the active carbon fibers having such characteristics that the object of the present invention, which is to provide the adsorptive layer having large adsorptive capacity, small mass transfer zone and small pressure loss, can be attained.

The active carbon fibers having such an adsorbability are produced by treating the material fibers such as cotton, hemp, cellulose regenerated fiber, polyvinyl alcohol fiber, acrylic fiber, aromatic polyamide fiber, petroleum pitch fiber, etc. so as to impregnate them with an adequate flame-resisting agent, subjecting them to flame-resisting treatment in an appropriate atmosphere at a temperature not exceeding 400° C., and further converting them into active carbon at a temperature of 500° C. and above.

The preferred material fibers are cellulose fibers, especially polynosic, fiber, from the viewpoints of high mechanical properties (strength, etc.) of the resulting active carbon fiber and the easiness of activation at a low temperature. A high strength is an important requirement for the active carbon fiber to prevent its dust formation.

As the above flame-resisting agent, generally the compounds containing phosphorus, nitrogen and halogen atoms are preferred. Especially, in the case of the cellulose fiber, the preferred flame-resisting agents are phosphoric acid, ammonium phosphate, tetrakis(hydroxymethyl)phosphonium salt, zinc chloride, etc. The said flame-resisting agent may be mixed in the material fiber or deposited with the surface of fiber by aftertreatment.

The atmosphere in which the flame-resisting treatment is made is preferably in inert gas (nitrogen, combustible gas, etc.), but it may contain oxygen to some degree.

The carbon activation treatment is carried out under the atmosphere containing water vapor, carbon monoxide and carbon dioxide by 5 to 70% by volume by heating to 500° C. or higher. In this case, an adequate activation ingredient may be impregnated first, or an activation may be made by the above method after the preparation of the carbonized fiber under the conventional process.

The sheet-form material of active carbon fiber of the present invention is preferably that having as high a volume density as possible from the viewpoint of the volume efficiency of the adsorptive capacity, preferably having the volume density of 0.06 g/cc or higher, more preferably of between 0.1 g/cc and higher and 0.3 g/cc and lower. The said sheet material requires to be thin enough for the matter to be adsorbed contained in the fluid to permeate and spread quickly into the interior of the sheet and to have sufficient degree of porosity. The sheet material may be either in the form of a paper, an non-woven fabric or a plate. However, observed from the preferred trends of thickness and volume density as above, the paper form is the most suitable. As an area density, a sheet of 10 to 200 g/m$^2$ is preferred. The said sheet material is constituted by an active carbon fiber, but may contain fibers of other kind or polymers, etc. in order to improve sheet-retaining property. However, the said sheet material requires to contain at least 10% by weight of active carbon fiber.

An active carbon fiber sheet is made by a conventional paper-making process from the active carbon fiber alone or by the mixture of a wood pulp or a synthetic pulp of polyacrylonitrile, polyethylene, etc. In this case, it is usual to use a binder for paper-making, such as PVA fiber. A blend with other pulp materials gives better reinforcement effect and improved processability on corrugating machine.

Shaping of an active carbon fiber sheet into a corrugated board can be made usually by a conventional corrugating machine. An active carbon fiber sheet is shaped into corrugation through a corrugation roll, and the resulting corrugated sheet (waved sheet) is bonded with a flat sheet on one surface or two surfaces. In bonding, the flat sheet is usually fixed by application of adhesive to the tops of the corrugations, but the application of adhesive is not always necessary, because these layers are fixed on piling up. In case of applying an adhesive, an agent which does not deteriorate the adsorbability to the sheet must be selected. Preferred adhesive is a corn starch mixed with some synthetic starches. According to necessity, a means of reinforcement may be provided by previously labelling a cord, etc. to the sheet in the direction of machining in the corrugating process.

The wave form of the corrugated sheet which constitutes the corrugated board may be, for example, U-shaped or V-shaped. The pitch of waves of the corrugated sheet is so provided as to form 15 to 150 waves per 30 cm length. The height of the wave is appropriately determined in the range of 1 to 20 mm according to the size of the pitch.

The finer the corrugation pitch is, the smaller are the tubular routes formed in the multi-layer member. This provides a larger pressure loss when the fluid is passed therethrough from the end of the said multi-layer member, while on the other hand a larger transfer velocity of the substance to be treated contained in the fluid to the tube walls of the corrugated board, thus making it possible to shorten the length of the multi-layer member necessary for the treatment. In this case, the substance to be adsorbed is adsorbed in the course of a shorter running distance. The pitch of the corrugation should be so elected as to be most suitable for the particular case in which the above two factors are balanced, and appropriately according to the property of the fluid and the concentration of the substance to be adsorbed. For the purpose of the present invention, the above described pitches are preferred.

FIG. 4 is a view of a spirally wound corrugated board according to the invention.

FIG. 5 is a view of a spirally wound corrugated board wherein the corrugations are inclinded at an angle to the direction of rolling.

FIG. 6 is a view of an adsorption apparatus using the corrugated board product of the invention.

FIG. 7 is a curve diagram showing the correlation between time and the concentration of xylene in air at the outlet side of a columnar adsorption body according to the invention.

Figure 1:
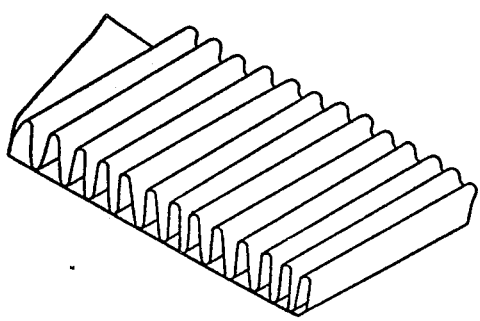
FIG. 1 is a view of a single faced corrugated board.
Figure 2:
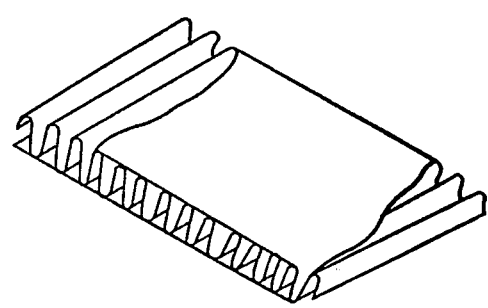
FIG. 2 is a view of a double faced corrugated board according to the invention.

Referring to the drawing, an example of the flat sheet bonded to one face of the corrugated sheet is shown as a single-faced corrugated board in FIG. 1, and that of the flat sheets bonded to both faces of the corrugated sheet is shown as a double-faced corrugated board in FIG. 2. In whichever of these cases the multi-layer member of the present invention can be formed. In case of forming a multi-layer member by rolling a corrugated board into a form of drum, use of a single-faced corrugated board is preferred.

Figure 3:
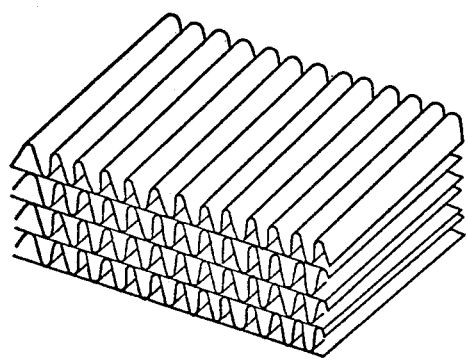
FIG. 3 is a view of a multi-layered corrugated board according to the invention.

The multi-layer member of the present invention can be produced by either placing a number of the thus obtained corrugated boards one upon another as shown in FIG. 3 or by rolling a board spirally in multi-layers as shown in FIG. 4. In case of forming a multi-layer member by rolling the board spirally, it is usual to roll at right angles to the direction of run of the pitch of the corrugated sheet, but a rolling with inclination at a certain angle to the direction of run of the wave may be made as in FIG. 5. In this case, the pressure loss may become somewhat large, but such a provision may be desirable because of the increased contact between the substance to be treated and the multi-layer sheet. In case of forming a multi-layer member by piling up a number of corrugated boards, the corrugations require to be laid in substantially the same direction, but may be laid with slight deviations.

The present invention relates to the multi-layers of the corrugated board. However, since the reciprocal layers of the corrugated sheet and the flat sheet provide the same multi-layer member as that disclosed by the present invention, the present invention of course includes these reciprocal layers.

The multi-layer member of corrugated board of the present invention is light in weight, having strong shape-retaining property, and possesses adsorbing function, so that it is useful as an adsorptive material to be used in the adsorption apparatus. In the adsorption apparatus, the above multi-layer member is mounted so that the fluid to be treated is supplied to the sectional surface of the multi-layer member, and the fluid to be treated flows along the tubular route formed by the corrugated sheet and the flat sheet of the multi-layer member.

Since the board member of the present invention employs the active carbon fiber having extremely large rate of adsorption, it effects adsorption promptly when the matter to be adsorbed reaches the surface of the sheet. Accordingly, when a small distance between the sheets is set in the range not to provide the pressure loss practically excessive, the thickness of the adsorptive layer can be lessened, and an adsorptive layer having a high adsorption capacity per volume (volume efficiency of adsorption capacity) can be obtained. The adsorption apparatus of the present invention is particularly effective when the fluid to be treated is gas, but is also usable for liquid.

In order to use the multi-layer member of corrugated board of the present invention as an adsorption apparatus, a plurality of such multi-layer members may be used or a multi-layer member is sectioned into plural blocks and made into an adsorption apparatus which performs adsorption in one block and desorption in one other, with said adsorption and desorption intermittently changed over, so that the adsorption and the desorption are continuously carried out.

Alternatively, a continuous adsorption and desorption apparatus may be provided by dividing the sectional area of the multi-layer member into plural blocks so as to effect adsorption in one block and desorption in the other, and by moving the multi-layer member of corrugated board continuously or the desorbing block continuously.

FIG. 6 shows an apparatus wherein a multi-layer member of corrugated board 1, formed into multi-layers by rolling up the corrugated board sheet as in FIG. 4, is disposed in such a manner that the fluid to be treated 4 and the purging gas 6 flow along the tubular route in the layers, under which the layer member 1 is continuously rotated in the space between the adsorption block 3 and the desorption block 5, so that the adsorption is continuously carried out while the active carbon fiber is being regenerated at the desorption block. The element 2 is a gear for rotating the multi-layer member of corrugated board.

In determining the adequate dimensions of the multi-layer member of active carbon fiber corrugated board of the present invention, some reviews are made, as follows:

Assuming the pressure loss caused at the time when the fluid to be treated is passed through an adsorptive material having the thickness (distance for passage of the fluid) Z at a wind tunnel velocity u to be ΔP, the relations are represented by the equation:

$$\Delta P = K \times u \times Z$$

The length of the mass transfer zone of the material contained in the fluid, i.e. the length of the zone in which the material to be treated is moved to the said structure, is assumed to be Zm. With the decrease in the pitch of the wave of the corrugated board layer of the present invention, the amount k is increased and Zm decreased. According to the purpose of use of the multi-layer member, the pitch and the height of the wave may be adequately selected. On the other hand, with regard to k and Zm of the structure of the present invention compared with those of the conventional filled layers of granular active carbon, generally k is remarkably small, but Zm is not so large. In other words, the multi-layer member of corrugated board of the present invention has characteristically an extremely small amount of Zm × k.

In developing the multi-layer member of corrugated board consisting of a thin sheet of active carbon fiber of the present invention the characteristics of the active carbon fiber have been specifically noted, i.e. it possesses extremely large adsorption velocity and it can be easily formed into a thin sheet. Since such a sheet has a good shapability into a corrugated board, it can be processed into a corrugated board having fine pitches of corrugation. Thus, a structure having extremely large contact area per unit volume is producible. For the reasons described above, the multi-layer member of corrugated board of the present invention can be formed with small Zm in comparison with the similar structure formed with other materials (e.g. the material comprising a sheet disposited with granular carbon).

According to a modified embodiment of the present invention, a catalyst may be carried on the active carbon fiber and formed into the structure of the present invention, by which the use as a catalyst reactor may be possible. The treatment for carrying the catalyst may be made in the stage of fiber or after formation into the structure of the present invention. As the catalyst, there may be exemplified plastinum, noble metal, etc. but is not limited thereto. In case the catalyst is carried on the active carbon fiber, the catalyst area is extremely large and the catalyst efficiency is high. Further, due to the small pressure loss per unit length in the direction of the flow route, the contact time can be relatively elongated.

According to another embodiment of the present invention, an absorbing agent may be carried on the active carbon fiber and formed into the structure of the present invention, by which the use as an absorbing apparatus may be possible. For example, a moisture absorbing agent such as lithium chloride, lithium bromide, may be deposited with the multi-layer member of the present invention and the product utilized as a dehimidifying apparatus. As a preferred active carbon fiber sheet applicable to the above case, there is, for example, a sheet of paper made by mixing with more than 10% by volume of a thermoplastic fiber and fusing by heat. Generally, the active carbon fiber has a large capacity to carry the absorbing agent. It can carry, for example, the lithium chloride by more than three times the amount of asbestos (weight of absorption per unit weight).

Practical and presently preferred embodiments of the present invention are illustratively shown in the following examples wherein measurements are made in the following manners:

(1) Equilibrium adsorption amount of benzene

The equilibrium adsorption amount is measured in accordance with JIS (Japanese Industrial Standard) K-1412. In this JIS, this is termed as a benzene adsorbing power, but it is indicated in modified expression in mg/g herein. The sample for determination is used in an amount of 0.1 to 0.2 g.

(2) Benzene adsorption rate constant: $K(min^{-1})$

The benzene adsorption rate constant is calculated by the following equation:

$$l_n \frac{500}{500 - C} = Kt \qquad (II)$$

wherein t is the time (min) and C is the leakage concentration (ppm) at the time (t) of the nitrogen stream containing 500 ppm benzene being passed through a filter layer having a thickness of 20 mm at a velocity of 0.15 m/sec. The constant (K) requires to be in the amount of more than 0.2/min, preferably more than 0.6/min. A specimen of active carbon fiber is used in a form of non-woven fabric having a volume density of 0.05 g/cc.

EXAMPLE 1

A regenerated cellulose fiber of 2 denier size, used as a precursor fiber, was carbonized and activated to give an active carbon fiber having a benzene adsorption rate constant of 1.6 $min^{-1}$. The said active carbon fiber, polyacrylonitrile pulp and polyvinyl alcohol fiber were mixed together at the rate of 70, 20 and 10% by weight respectively, and the mixture was poured onto a conventional cylinder wet type paper machine, heat pressed in a flat state to give a sheet of active carbon fiber paper having a weight of 50 g/m². The resulting sheet of paper was treated with a conventional single-faced corrugator to give a single-faced corrugated board having the pitch of corrugation 3.3 mmφ and the height of corrugation 1.4 mm.

The said corrugated board was wound up with starch being applied to the tops of the corrugations on a core-filled axle of 20 mm in diameter to build up a column of 600 mmφ in outer diameter and about 1200 mm in length. The starch used at the time of forming the corrugated board and winding into the column consisted mainly of a corn starch with the addition of a small amount of synthetic starch (LIFE BOND AV-650, trade mark manufactured by Nissho Kako K.K.).

From the above column there was cut out a small columnar body having a length of 105 mm, both sections of the columnar body were ground into flat surfaces, and a columnar layer having the outer diameter of 600 mmφ and the length of 100 mm was obtained.

An air containing 200 ppm of xylene at 20° C. was passed through the said columnar layer in the direction parallel with the columnar surface. The result of measurement on the variation by time (break-through curve) of the concentration of xylene in the air on the outlet side at that time is shown in the real line in FIG. 7. The equilibrated adsorption amount obtained from the said breakthrough curve (obtained from the shaded area in FIG. 7), length of the mass transfer zone Zm

[obtained from $t_5$, $t_{50}$ and Z=10 cm in FIG. 7 by the formula (I)], and the pressure loss at that time, as well as the pressure loss coefficient k, are summarized in Table 1.

$$Zm = Z\frac{2(t_{50} - t_{0.5})}{t_{50}} \qquad (I)$$

TABLE 1

| Item | Measurement amount |
|---|---|
| Pressure loss ΔP [mmAq] | 9.6 |
| k [mmAq/(cm) (cm/sec)] | $9.6 \times 10^{-3}$ |
| Zm [cm] | 9.5 |
| Equilibrium adsorption amount [%] | 29 |

EXAMPLE 2

From the column of Example 1 (length about 1200 mm) a small columnar body having a length of 15 cm was cut out, and both sections of the columnar body were planed. The end surfaces thereof were dipped by the length of 0.5 cm each in a phenol resin solution and were heated at 100° C. to cure. By the use of the thus obtained columnar layer, a rotary adsorption and concentration apparatus as shown in FIG. 6 was made. The desorbing zone 5 of the duct around the axis of the cylinder (1) is an angle of 44° to the horizontal plane. An air containing 50 ppm of xylene at 23° C. was passed through the adsorbing zone of the apparatus at the flow rate of 60 m³/min. In the desorbing zone, the xylene adsorbed to the active carbon fiber of the columnar layer was purged by passing through the air heated at 120° C. at the flow rate of 3 m³/min. During the interval the columnar layer was rotated around the axis of the cylinder as a center at 1 r.p.m. As a result, the pressure loss of the columnar layer was 55 mmAq, and the xylene concentration of the air after the adsorption treatment was 2 ppm. By the said apparatus the xylene was concentrated into 20 times the original volume. Thus, it is sufficient to treat the air of only 3 m³/min containing about 1000 ppm xylene.

EXAMPLE 3

The columnar layer obtained in Example 1 was impregnated with an aqueous solution of chloroplatinic acid, which was reduced with an alkaline hydrazin solution to carry 5% by weight of platinum catalyst. An air containing 100 ppm of carbon monoxide at 20° C. was passed through the said platinum carried layer at the flow rate of 10 m³/min. At that time, the pressure loss of the carrier-containing layer was 5.7 mmAq, and the conversion rate from carbon monoxide to carbon dioxide was 93%. The conversion rate is the amount obtained from the following equation:

$$\text{Conversion rate} = (1 - \frac{C_o}{C_i}) \times 100\ (\%)$$

wherein $C_i$ is the CO concentration at the inlet and $C_o$ is the CO concentration at the outlet.

EXAMPLE 4

The columnar layer obtained in Example 1 was dipped in an aqueous solution of LiCl whose concentration was adjusted to 0.15 g/ml at 20° C., after which it was lifted up and centrifuged to remove the surplus aqueous solution of LiCl. As a result, the LiCl was carried by 610 g. An air of temperature at 20° C. and absolute humidity at 12 g/kg was passed through said LiCl carrying layer at the flow rate of 10.1 m³/min. The result showed that the absolute humidity of the air on the outlet side of the columnar layer was suppressed to the level not exceeding 1 g/kg for about 10 min.

What is claimed is:

1. A multi-layer member comprising multiple corrugated boards containing active carbon fiber in an amount of at least 10% by weight and having a volume density of at least 0.06 g/cc, the channels of the corrugated boards being arranged in substantially the same direction so as to permit a fluid flow through the channels along the surfaces of the corrugated boards, said carbon fiber having the characteristics of an equilibrium adsorption amount of benzene of not less than 200 mg/g and a benzene adsorption rate constant of not less than 0.2 min$^{-1}$.

2. The multi-layer member according to claim 1, formed by winding up in a columnar state a single-faced corrugated board consisting essentially of a corrugated sheet of paper bonded with a flat sheet of paper on one surface thereof.

3. The multi-layer member according to claim 2, wherein there are provided at least two multi-layer members of corrugated board, one of which is used for adsorbing the matters to be adsorbed contained in a fluid and the other is used for desorbing the adsorbed matter from the layer which adsorbed the matters to be adsorbed, said layers being changed over sequentially.

4. The multi-layer member according to claim 1, impregnated with a catalyst.

5. A process for adsorbing materials contained in a fluid, utilizing the multi-layer member of claim 2 which comprises supplying the fluid along the corrugations of the multi-layer member of corrugated boards and through the channels of said corrugations.

6. A continuous rotary type adsorption apparatus provided with the multi-layer member of claim 2, sectioned into a block for adsorbing the materials to be adsorbed, contained in a fluid and a block for desorbing the adsorbed material respectively in the direction of rotation of said columnar layer while rotating said columnar multi-layer member.

7. An adsorptive member consisting essentially of multi-layers of corrugated board wherein the channels of the corrugations are arranged in substantially the same direction so as to permit a fluid flow through the channels along the corrugations, each layer consisting essentially of a corrugated material bonded on at least one surface thereof with a flat sheet of material, said corrugated board containing active carbon fiber in an amount of at least 10% by weight and having a volume density of at least 0.06 g/cc, said carbon fiber having the characteristics of an equilibrium adsorption amount of benzene of not less than 200 mg/g and a benzene adsorption rate of not less than 0.2 min$^{-1}$.

8. The adsorptive member of claim 7, wherein a plurality of said layers of the corrugated board bonded with a flat sheet of material is disposed in a stacked relationship.

9. The adsorption member of claim 7 comprising one layer of corrugated board wound up into a columnar state, thereby forming a plurality of layers.

10. The adsorptive member of claim 7, wherein said corrugated board has a volume density of about 0.1 g/cc to about 0.3 g/cc.

11. The adsorptive member of claim 7, said corrugated board further containing a wood pulp or a synthetic pulp mixed with said carbon fiber.

12. The adsorptive member of claim 7 wherein the adsorptive member consists essentially of paper which contains an active carbon fiber.

13. The adsorptive member of claim 7, wherein the adsorptive member consists essentially of a non-woven fabric which contains the active carbon fiber.

14. The adsorptive member of claim 7, wherein the adsorptive member consists essentially of a plate which contains the active carbon fiber.

15. The adsorptive member of claim 7, wherein the active carbon fibers are produced by impregnating material fibers selected from the group consisting of cotton, hemp, cellulose regenerated fiber, polyvinyl alcohol fiber, acrylic fiber, aromatic polyamide fiber, and petroleum pitch fiber with a flame-resisting agent, subjecting the thus treated fibers to a flame-resisting treatment at a temperature not exceeding 400° C., and converting the fibers into active carbon at temperatures of at least 500° C.

16. The adsorptive member of claim 9, wherein the layer of corrugated material is wound up with an angle of inclination to the direction of run of the corrugation.

17. The adsorptive member of claim 8, wherein the layers of corrugated material are stacked with slight variations to the direction of corrugations.

18. A continuous rotary-type adsorption apparatus which comprises a chamber containing an adsorption zone and a desorption zone, means for introducing and removing the fluid to be adsorbed, into and out of the adsorption zone, means for introducing and removing a desorbing fluid into and out of the desorbing zone and an adsorptive member rotatably disposed within said chamber, said adsorptive member being adapted to be alternately exposed to said adsorption zone and desorption zone as it is rotated in said chamber, thereby adsorbing the material to be adsorbed from the fluid being treated in the absorbing zone and regenerating the adsorptive member in the desorbing zone, said adsorptive member comprising multiple layers of corrugated board containing active carbon fiber in an amount of at least 10% by weight and having a volume density of at least 0.06 g/cc, and being arranged in said chamber in such a manner that the fluid flows along the corrugations, said carbon fiber having the characteristics of an equilibrium adsorption amount of benzene of not less than 200 mg/g and a benzene adsorption rate constant of not less than 0.2 $min^{-1}$.

19. A process for adsorbing materials containing a fluid utilizing an adsorption zone and a desorption zone, which comprises introducing and removing the fluid to be adsorbed into and out of the adsorption zone, introducing and removing a desorbing fluid into and out of the desorbing zone, and exposing an adsorptive member alternatively to said adsorption zone and desorption zone, thereby adsorbing the material to be adsorbed from the fluid being treated in the adsorbing zone and regenerating the adsorptive member in the desorbing zone, said adsorptive member comprising multiple layers of corrugated board, each layer consisting essentially of a corrugated material bonded on at least one surface thereof with a flat sheet of material said corrugated board containing active carbon fiber in an amount of at least 10% by weight and having a volume density of at least 0.06 g/cc, said carbon fiber having the characteristics of an equilibrium adsorption amount of benzene of not less than 200 mg/g and a benzene adsorption rate constant of not less than 0.2 $min^{-1}$, said fluid being supplied along the corrugations and through the channels of said corrugations.

* * * * *

UNITED STATES PATENT AND TRADEMARK OFFICE
CERTIFICATE OF CORRECTION

PATENT NO. : 4,259,092
DATED : March 31, 1981
INVENTOR(S) : Tatsuki MATSUO et al It is certified that error appears in the above–identified patent and that said Letters Patent are hereby corrected as shown below:

IN THE HEADING OF THE PATENT:

In Section [73], change "Toyo Boseki Kabushiki Kaisha, Osaka, Japan" to --Toyo Boseki Kabushiki Kaisha, Osaka, Japan and Taikisha Ltd., Tokyo, Japan--.

Signed and Sealed this

Sixth Day of August 1985

[SEAL]

Attest:

DONALD J. QUIGG

Attesting Officer

Acting Commissioner of Patents and Trademarks